(12) United States Patent
Choi

(10) Patent No.: US 11,791,765 B2
(45) Date of Patent: Oct. 17, 2023

(54) SOLAR POWER GENERATOR HAVING VARIABLE SHAPE

(71) Applicant: Korea Maritime University Industry-Academic Cooperation Foundation, Busan (KR)

(72) Inventor: Hyeung Sik Choi, Busan (KR)

(73) Assignee: KOREA MARITIME UNIVERSITY INDUSTRY-ACADEMIC COOPERATION FOUNDATION, Busan (KR)

( * ) Notice: Subject to any disclaimer, the term of this patent is extended or adjusted under 35 U.S.C. 154(b) by 0 days.

(21) Appl. No.: 18/098,507

(22) Filed: Jan. 18, 2023

(65) Prior Publication Data

US 2023/0238915 A1 Jul. 27, 2023

(30) Foreign Application Priority Data

Jan. 27, 2022 (KR) .................. 10-2022-0011986

(51) Int. Cl.
*H02S 30/10* (2014.01)
*H02S 20/32* (2014.01)
*B60L 8/00* (2006.01)
*H02S 30/20* (2014.01)

(52) U.S. Cl.
CPC ............ *H02S 20/32* (2014.12); *B60L 8/003* (2013.01); *H02S 30/10* (2014.12); *H02S 30/20* (2014.12)

(58) Field of Classification Search
USPC .............................................. 136/243–265
See application file for complete search history.

(56) References Cited

U.S. PATENT DOCUMENTS

| 5,520,747 | A | 5/1996 | Marks |
| 8,851,560 | B1 | 10/2014 | Freeman |
| 10,668,816 | B2 | 6/2020 | Bucknell |
| 2012/0043143 | A1 | 2/2012 | Hui et al. |
| 2012/0073885 | A1 | 3/2012 | Glynn |

FOREIGN PATENT DOCUMENTS

| CN | 205377420 U | * | 7/2016 |
| CN | 212183442 U | * | 12/2020 |
| KR | 20110007573 A | * | 1/2011 |

* cited by examiner

*Primary Examiner* — Bach T Dinh
(74) *Attorney, Agent, or Firm* — Paratus Law Group, PLLC

(57) ABSTRACT

There is provided a solar power generator having a variable shape which can secure a maximum solar power generation area by being unfolded horizontally and upward in the case of performing solar power generation and can be transformed to have a minimum volume by being transformed into a box shape in the case of not performing solar power generation. The solar power generator includes a base frame, four solar panel members for forming a box which are respectively coupled to four sides of the base frame, a rotation drive source for rotating each of the four solar panel members, a tube member, a lower surface of which is fixed to a center portion of an upper surface of the base frame, an air injection and discharge part, a top plate for the tube member, and a plurality of solar panel assemblies for tube member sidewalls.

9 Claims, 9 Drawing Sheets

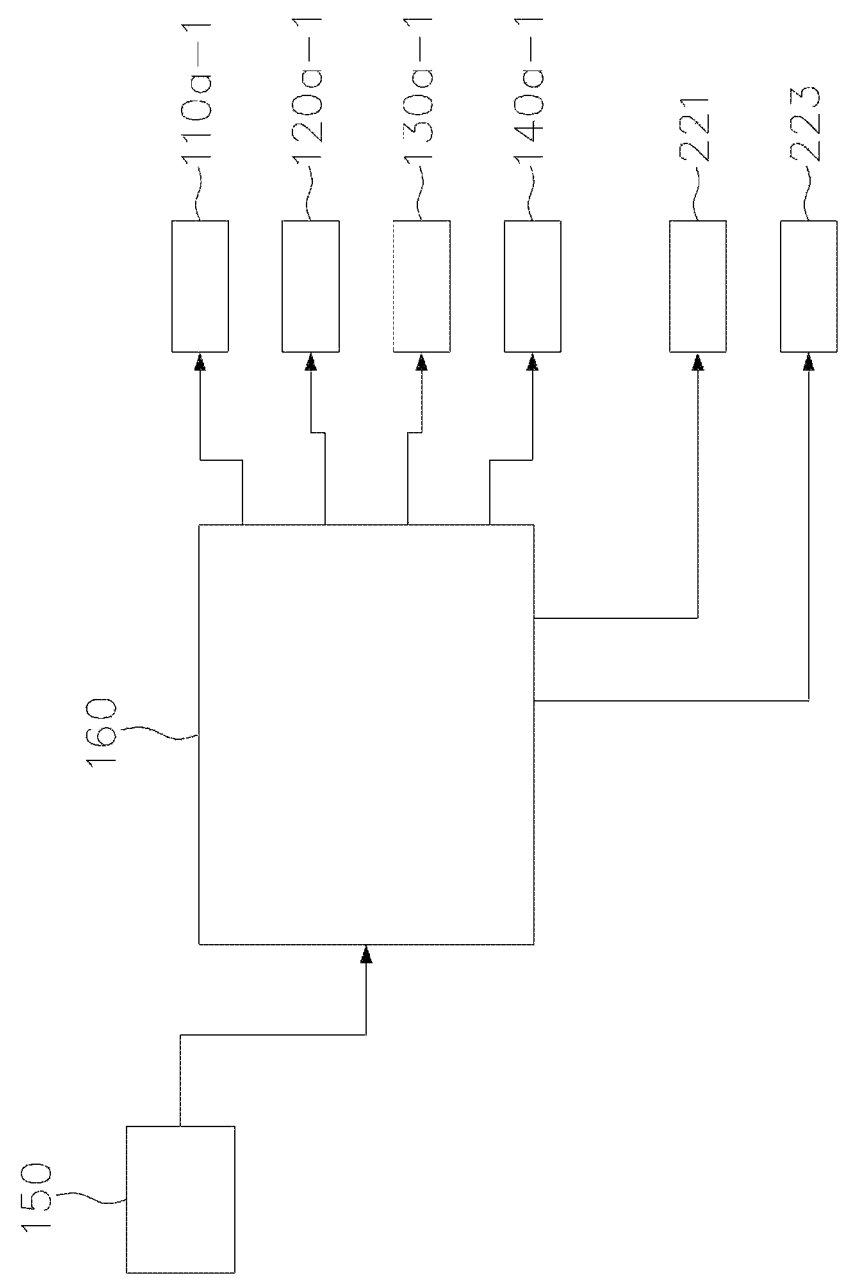

SOLAR POWER GENERATOR HAVING VARIABLE SHAPE

CROSS-REFERENCE TO RELATED APPLICATION

The present application claims priority to Korean Patent Application No. 10-2022-0011986 (filed on Jan. 27, 2022), which is hereby incorporated by reference in its entirety.

BACKGROUND

The present disclosure relates generally to a solar power generator which generates power by sunlight. More particularly, the present disclosure relates to a solar power generator which can secure a maximum solar power generation area by being unfolded horizontally and upward in the case of performing solar power generation and can be transformed to have a minimum volume by being transformed into a box shape in the case of not performing solar power generation.

In recent years, due to high oil prices due to an increase in the use of fossil energy, which was a conventional energy source, and due to the depletion of fossil energy, development of alternative energy is being undertaken.

Among alternative energies, there is great interest in the field of solar energy, which is non-polluting and can be used infinitely. In particular, in solar power generation, there is no mechanical vibration or noise because a power generation part is a semiconductor element and a controller is an electronic part, a solar cell has a long lifespan of more than several decades, a power generation system can be semi-automated or automated, and the costs of operation and maintenance can be minimized.

In addition, solar power generation has an advantage that solar power generation can be widely used for home use because solar power generation does not require a large-scale power generation facility and can be performed on a small scale.

Meanwhile, recently, in order to reduce the use of fossil energy and improve environmental pollution, the development and supply of electric vehicles have been actively conducted. In the case of such electric vehicles, electric energy charged in a battery by using a large-capacity battery is used as a power source, and when all the electric energy stored in the battery is used, the battery is required to be charged at a separate charging station, and it takes a considerable amount of time to charge the battery.

Considering this point, various studies are being conducted on a solar power generator that can be installed in an electric vehicle and generate power by using sunlight.

In particular, in the case of an electric vehicle, it is difficult to secure a large solar light projected area (i.e., a solar power generation area) due to limitations of a vehicle.

SUMMARY

Accordingly, the present disclosure has been made keeping in mind the above problems occurring in the related art, and the present disclosure is intended to propose a solar power generator having a variable shape which can secure a maximum solar power generation area by being unfolded horizontally and upward in the case of performing solar power generation and can be transformed to have a minimum volume by being transformed into a box shape in the case of not performing solar power generation.

In order to achieve the above objective, according to one aspect of the present disclosure, there is provided a solar power generator having a variable shape, the generator including: a base frame having a rectangular shape; four solar panel members for forming a box which are respectively coupled to four sides of the base frame to rotate inward and outward, the solar panel members being configured to form a shape of a rectangular box in cooperation with the base frame when the solar panel members rotate inward and to be unfolded when the solar panel members rotate outward; a rotation drive source for rotating each of the four solar panel members inward and outward; a tube member, a lower surface of which is fixed to a center portion of an upper surface of the base frame, the tube member being configured to expand in a vertical direction by air injection and to contract in the vertical direction by air discharge; an air injection and discharge part for injecting air into the tube member and discharging air inside the tube member; a top plate for the tube member being fixed horizontally on an upper surface of the tube member; and a plurality of solar panel assemblies for tube member sidewalls being arranged around the tube member to surround the tube member, each of the plurality of solar panel assemblies having a plurality of solar panels for a unit sidewall coupled to each other to be foldable in the vertical direction, wherein an upper end of the solar panel assembly is connected rotatably to an edge of the top plate, and a lower end of the solar panel assembly is connected rotatably to the base frame.

In the generator, when the four solar panel members for forming a box rotate outward, the four solar panel members for forming a box may be unfolded horizontally.

In the generator, the four solar panel members for forming a box may include: a first solar panel member for forming a box located at a front side; a second solar panel member for forming a box located at a rear side; a third solar panel member for forming a box located at a left side; and a fourth solar panel member for forming a box located at a right side, wherein the first solar panel member for forming a box may include: a 1-1 solar panel for forming a box which is rotatably coupled to the base frame at a first end part thereof; and a 1-2 solar panel for forming a box which is rotatably coupled to a second end part of the 1-1 solar panel for forming a box at an end part thereof.

In the generator, the rotation drive source may include a first rotation drive source for rotating the first solar panel member for forming a box, wherein the first rotation drive source may include: a 1-1 drive shaft which is provided on the first end part of the 1-1 solar panel for forming a box and is rotatably supported on the base frame; a first motor for rotating the 1-1 drive shaft; a 1-2 drive shaft which is provided on the end part of the 1-2 solar panel for forming a box and is rotatably supported on the second end part of the 1-1 solar panel for forming a box; and a first belt which couples the 1-1 drive shaft to the 1-2 drive shaft.

In the generator, the air injection and discharge part may include: a pneumatic device for conveying air; a pneumatic tube which connects the pneumatic device with the tube member; and a solenoid valve which is provided between the pneumatic device and the pneumatic tube and opens and closes the pneumatic tube.

In the generator, the top plate may be a solar panel.

The generator may further include: an optical sensor which provides a solar direction detection signal; and a controller which controls the rotation drive source according to the solar direction detection signal for controlling a rotation angle of each of the four solar panel members for forming a box.

In the generator, the solar panel member for forming a box may have solar panels disposed respectively on opposite surfaces thereof or may include a bifacial solar panel capable of generating power on opposite surfaces thereof.

In the generator, the base frame may be mounted on a roof of a vehicle.

As described above, the solar power generator of the present disclosure can secure a maximum solar power generation area by being unfolded horizontally and upward in the case of performing solar power generation and can be transformed to have a minimum volume by being transformed into a box shape in the case of not performing solar power generation.

Accordingly, the solar power generator of the present disclosure is used to secure a large power generation area by being mounted on a vehicle such as an electric vehicle and may be transformed into a form that does not interfere with vehicle operation by being transformed into a box shape in the case of not performing solar power generation.

In addition, the solar power generator of the present disclosure may be installed and used in an electric vehicle, and may also be used in connection with apparatuses other than vehicles such as ships.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 9 is a control block diagram of the solar power generator having a variable shape according to the embodiment of the present disclosure.

DETAILED DESCRIPTION

Figure 1:
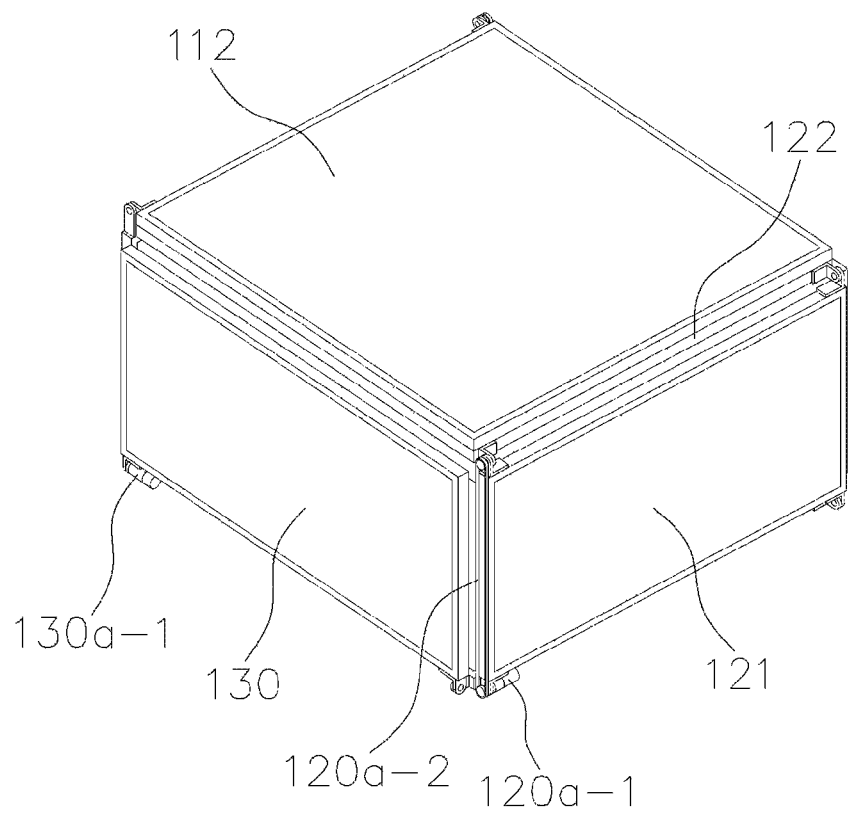
FIG. 1 is a perspective view of a solar power generator having a variable shape according to an embodiment of the present disclosure.

Hereinafter, an exemplary embodiment of the present disclosure will be described in detail with reference to the accompanying drawings so that those skilled in the art to which the present disclosure belongs can easily embody the present disclosure. However, the present disclosure may be embodied in various different forms and is not limited to the embodiment described herein. In addition, in the drawings, parts irrelevant to the description of the present disclosure are omitted in order to clearly describe the present disclosure, and similar reference numerals are assigned to similar parts throughout the specification.

Throughout the specification, when a part "includes" a certain component, it means that other components may be further included rather than excluding the other components unless specifically stated to the contrary.

Figure 2:
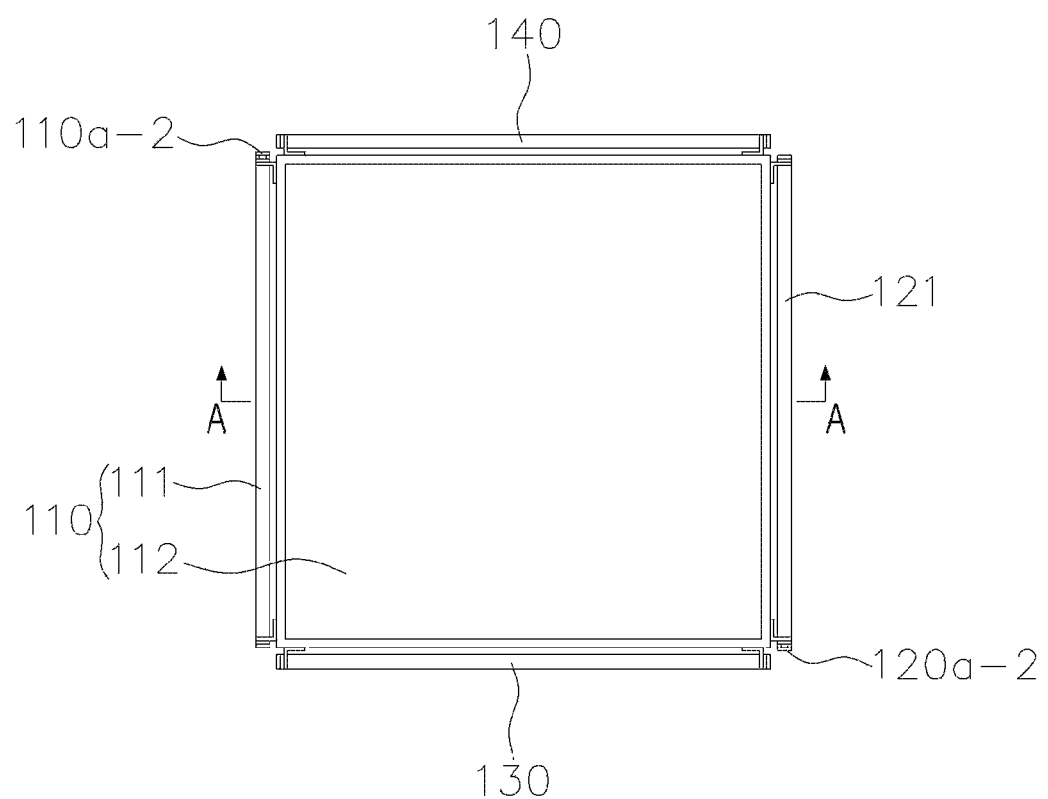
FIG. 2 is a top plan view of FIG. 1.
Figure 3:
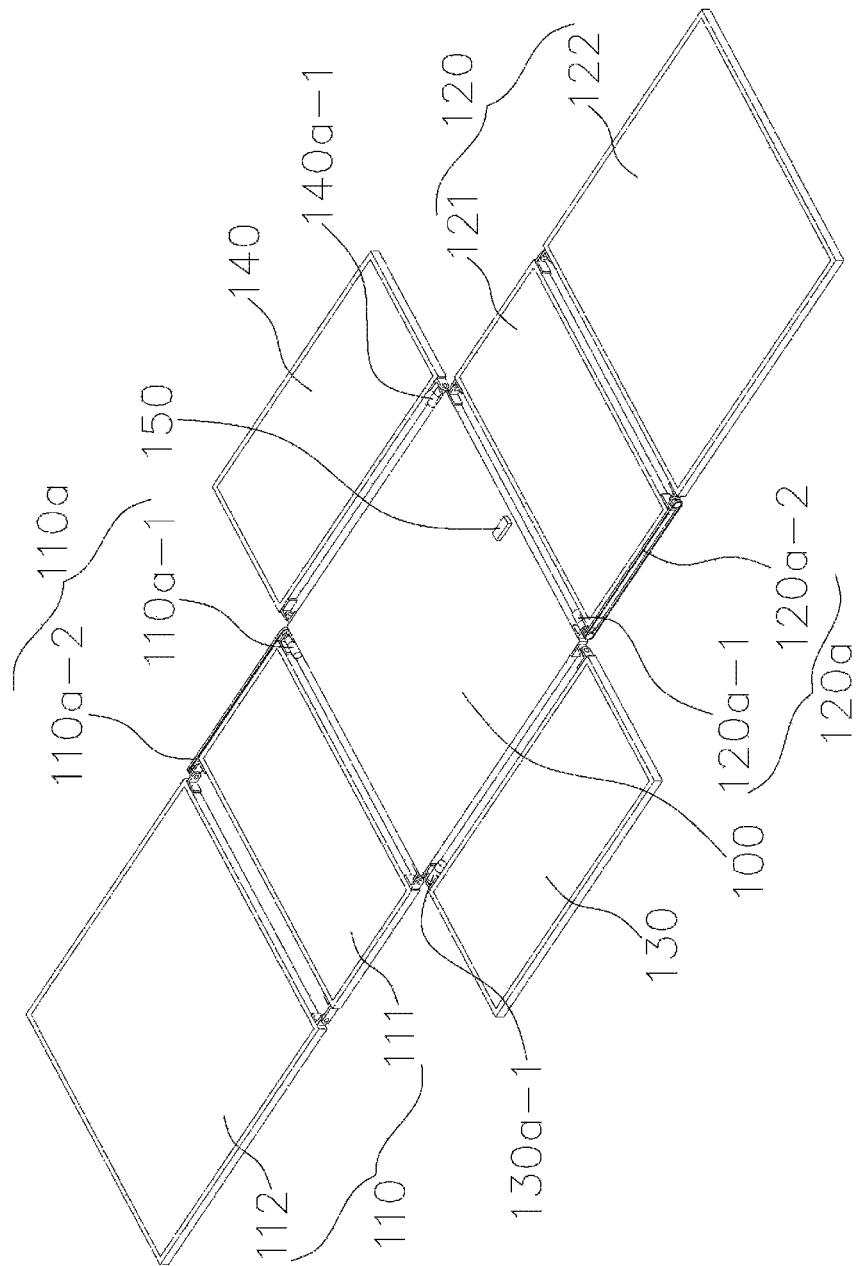
FIG. 3 is a perspective view of a state in which the solar power generator having a variable shape of FIG. 1 is unfolded horizontally and upward.
Figure 4:
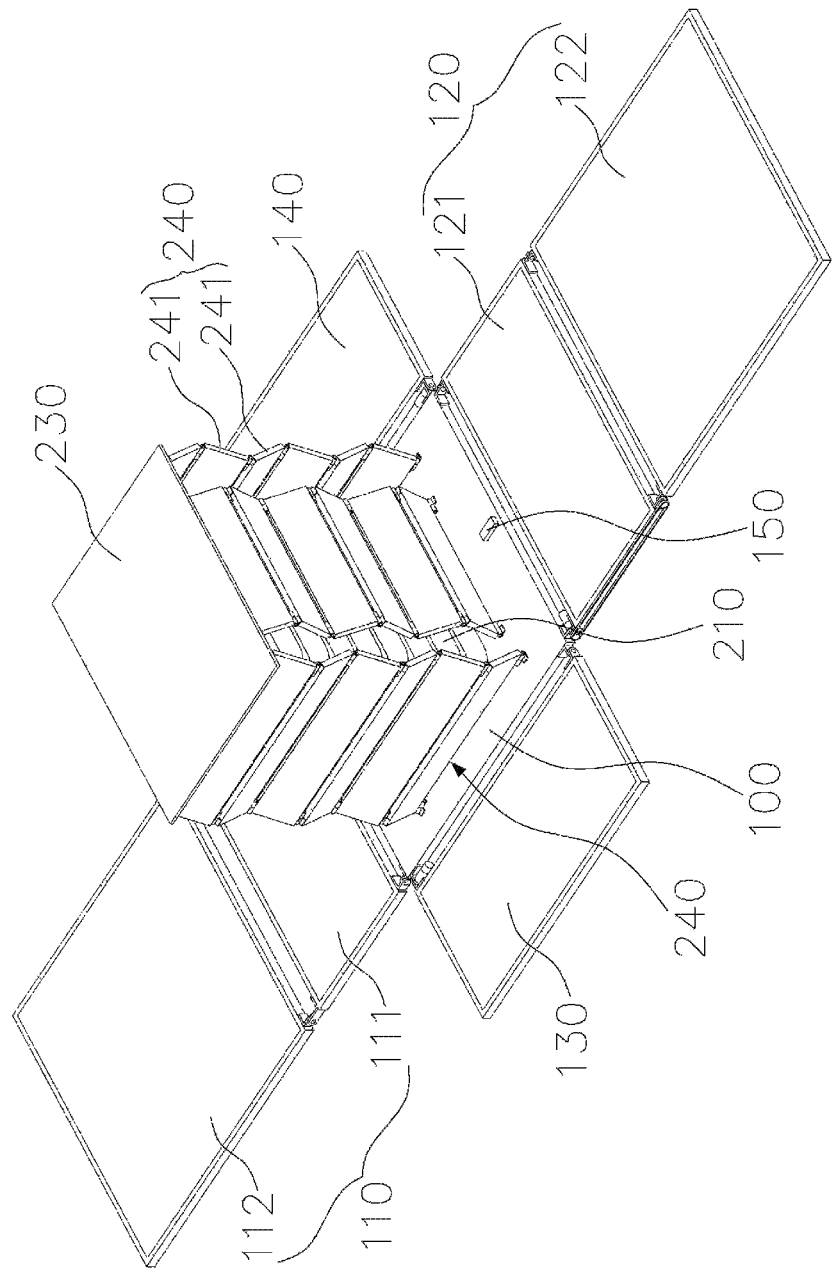
FIG. 4 is a perspective view illustrating the states of a base frame and first, second, third, and fourth solar panel members for forming a box in FIG. 3.
Figure 5:
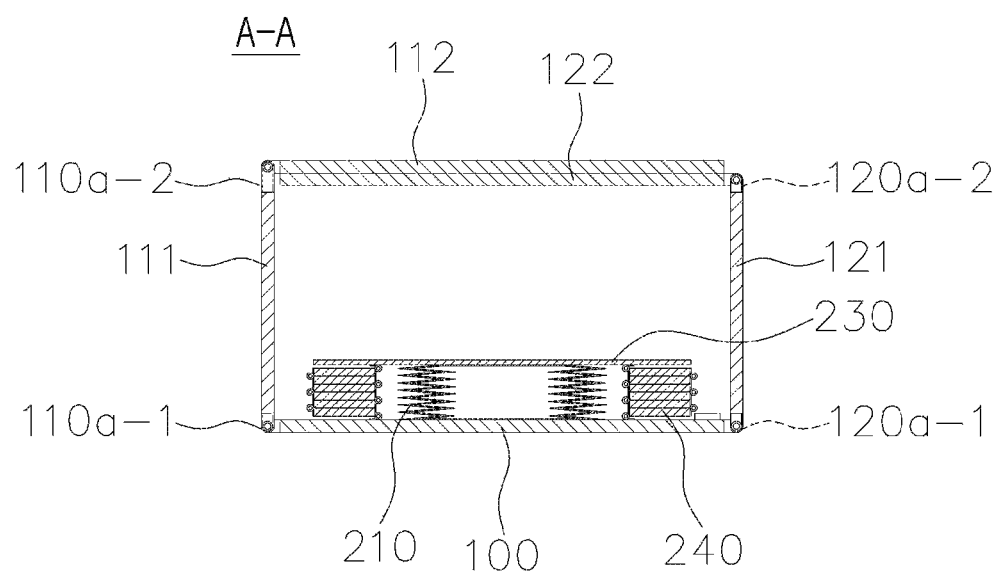
FIG. 5 is a sectional view taken along line A-A of FIG. 2.
Figure 6:
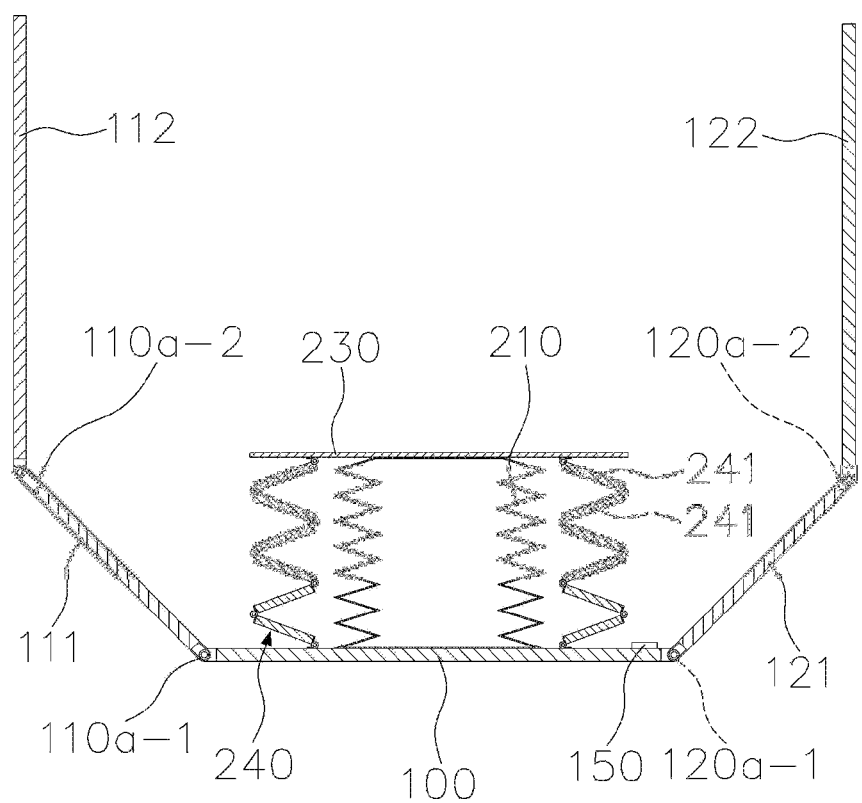
FIG. 6 is a sectional view of a state in which the solar power generator having a variable shape seen from the state of FIG. 5 is being unfolded horizontally and upward.
Figure 7:
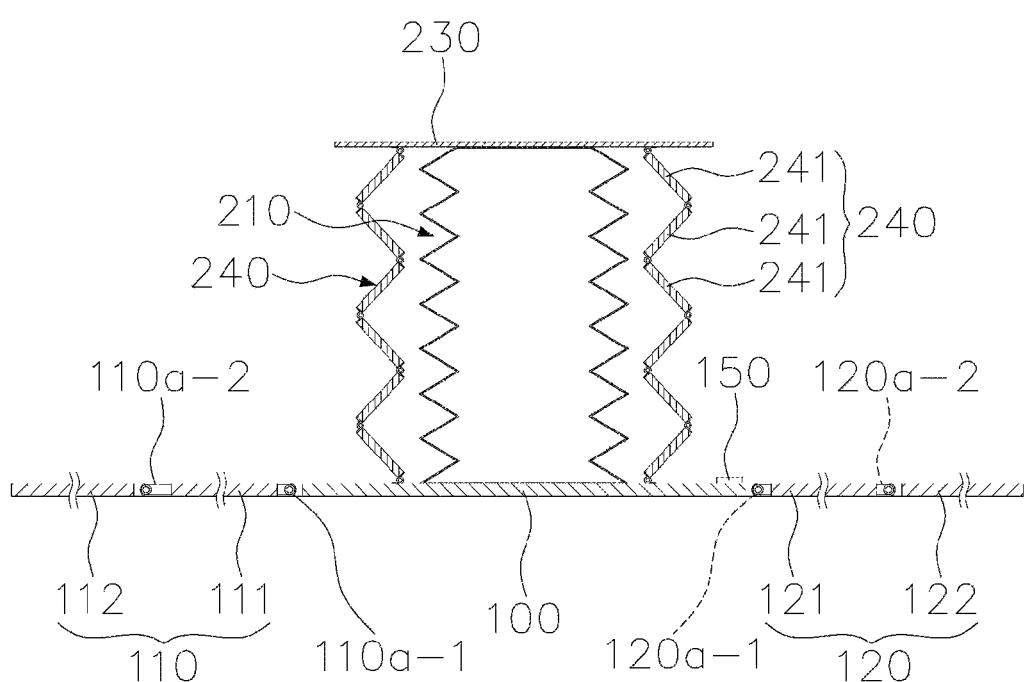
FIG. 7 is a sectional view of a state in which the solar power generator having a variable shape seen after the state of FIG. 6 is completely unfolded horizontally and upward.
Figure 8:
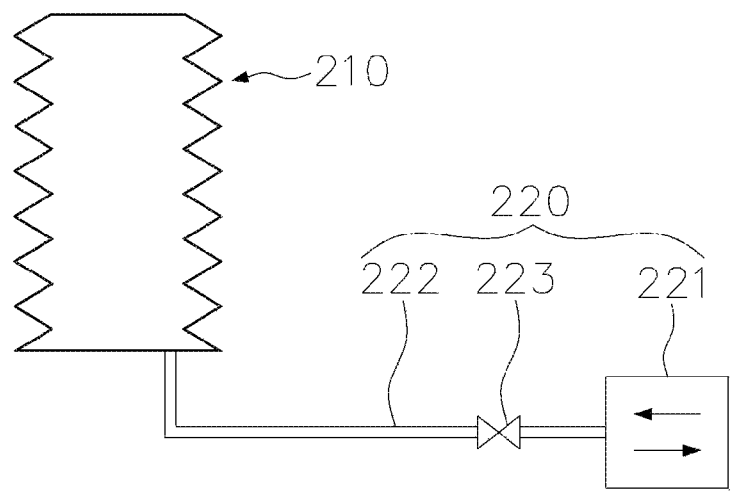
FIG. 8 is a view illustrating a tube member and an air injection and discharge part of the solar power generator having a variable shape according to the embodiment of the present disclosure.

FIG. 1 is a perspective view of a solar power generator having a variable shape according to the embodiment of the present disclosure; FIG. 2 is a top plan view of FIG. 1; FIG. 3 is a perspective view of a state in which the solar power generator having a variable shape of FIG. 1 is unfolded horizontally and upward; FIG. 4 is a perspective view illustrating the states of a base frame and first, second, third, and fourth solar panel members for forming a box in FIG. 3; FIG. 5 is a sectional view taken along line A-A of FIG. 2; FIG. 6 is a sectional view of a state in which the solar power generator having a variable shape seen from the state of FIG. 5 is being unfolded horizontally and upward; FIG. 7 is a sectional view of a state in which the solar power generator having a variable shape seen after the state of FIG. 6 is completely unfolded horizontally and upward; FIG. 8 is a view illustrating a tube member and an air injection and discharge part of the solar power generator having a variable shape according to the embodiment of the present disclosure; and FIG. 9 is a control block diagram of the solar power generator having a variable shape according to the embodiment of the present disclosure.

The solar power generator of the present disclosure includes the base frame 100, the four solar panel members 110, 120, 130, and 140 for forming a box, the tube member 210, a top plate 230 for the tube member, and solar panel assemblies 240 for tube member sidewalls.

The base frame 100 is a rectangular plate, and most other components are coupled to the base frame 100.

When the solar power generator of the present disclosure is used for a vehicle, the base frame 100 may be mounted on a roof of the vehicle.

The solar panel members 110, 120, 130, and 140 for forming a box are provided respectively on four sides of the base frame 100. That is, the four solar panel members 110, 120, 130, and 140 for forming a box are coupled to the base frame 100.

The four solar panel members 110, 120, 130, and 140 for forming a box are provided to be rotatable inward and outward, and form a shape of a rectangular box in cooperation with the base frame 100 when rotated inward.

Furthermore, when the four solar panel members 110, 120, 130, and 140 for forming a box rotate outward, the four solar panel members 110, 120, 130, and 140 for forming a box are unfolded horizontally and have a posture suitable for performing solar power generation.

The solar panel members 110, 120, 130, and 140 for forming a box respectively include rotation drive sources 110a, 120a, 130a, and 140a for rotating the solar panel members 110, 120, 130, and 140 for forming a box inward and outward.

The four solar panel members 110, 120, 130, and 140 for forming a box include a first solar panel member 110 for forming a box located at a front side, a second solar panel member 120 for forming a box located at a rear side, a third solar panel member 130 for forming a box located at a left side, and a fourth solar panel member 140 for forming a box located at a right side.

The third solar panel member 130 for forming a box constitutes a left sidewall of the quadrangular box and is configured as one solar panel.

The fourth solar panel member 140 for forming a box constitutes a right sidewall of the quadrangular box and is configured as one solar panel.

That is, the third solar panel member 130 for forming a box includes a solar panel which is coupled rotatably to the base frame 100 at an end part thereof.

In addition, a third rotation drive source 130a for the third solar panel member 130 for forming a box includes a third motor 130a-1 for rotating the third solar panel member 130 for forming a box relative to the base frame 100.

Likewise, the fourth solar panel member 140 for forming a box includes a solar panel which is coupled rotatably to the base frame 100 at an end part thereof.

In addition, a fourth rotation drive source 140a for the fourth solar panel member 140 for forming a box includes a fourth motor 140a-1 for rotating the fourth solar panel member 140 for forming a box relative to the base frame 100.

The first solar panel member 110 for forming a box includes a 1-1 solar panel 111 for forming a box which is coupled rotatably to the base frame 100 at a first end part thereof, and a 1-2 solar panel 112 for forming a box which is coupled rotatably to a second end part of the 1-1 solar panel 111 for forming a box at an end part thereof.

The 1-1 solar panel 111 for forming a box constitutes a front sidewall of the quadrangular box, and the 1-2 solar panel 112 for forming a box constitutes a top cover of the quadrangular box.

A first rotation drive source 110a for the first solar panel member 110 for forming a box includes a 1-1 drive shaft which is provided on the first end part of the 1-1 solar panel 111 for forming a box and is rotatably supported on the base frame 100, a first motor 110a-1 for rotating the 1-1 drive shaft, a 1-2 drive shaft which is provided on the end part of the 1-2 solar panel 112 for forming a box and is rotatably supported on the second end part of the 1-1 solar panel 111 for forming a box, and a first belt 110a-2 which couples the 1-1 drive shaft to the 1-2 drive shaft.

Accordingly, when the 1-1 solar panel 111 for forming a box is rotated relative to the base frame 100 by the rotation of the 1-1 drive shaft performed by the first motor 110a-1, the 1-2 drive shaft operating in cooperation with the 1-1 drive shaft through the first belt 110a-2 rotates such that the 1-2 solar panel 112 for forming a box rotates relative to the 1-1 solar panel 111 for forming a box.

In this case, the first belt 110a-2 is preferably a timing belt, and the 1-1 drive shaft and the 1-2 drive shaft rotate at a ratio of 1:1, so the 1-1 solar panel 111 for forming a box and the 1-2 solar panel 112 for forming a box preferably have the same rotational speeds.

Likewise, the second solar panel member 120 for forming a box includes a 2-1 solar panel 121 for forming a box which is coupled rotatably to the base frame 100 at a first end part thereof, and a 2-2 solar panel 122 for forming a box which is coupled rotatably to a second end part of the 2-1 solar panel 121 for forming a box at an end part thereof. Like the first rotation drive source 110a, a second rotation drive source 120a for the second solar panel member 120 for forming a box includes a 2-1 drive shaft, a 2-2 drive shaft, a second motor 120a-1, and a second belt 120a-2.

Here, the 2-1 solar panel 121 for forming a box constitutes the rear sidewall of the quadrangular box, and the 2-2 solar panel 122 for forming a box is layered with the 1-2 solar panel 112 for forming a box to constitute the top cover of the quadrangular box.

The tube member 210 in the form of a sealed rubber tube is fixedly arranged on the center portion of the upper surface of the base frame 100.

While the lower surface of the tube member 210 is fixed to the upper surface of the base frame 100, the tube member 210 has a bellows structure to expand vertically when air is injected into the tube member 210 and to contract vertically when air inside the tube member 210 is discharged to the outside.

The tube member 210 includes the air injection and discharge part 220 for injecting air into the tube member 210 and for discharging air inside the tube member 210 to the outside.

The air injection and discharge part 220 includes: a pneumatic device 221 such as a pneumatic pump for conveying compressed air, that is, injecting and discharging compressed air; a pneumatic tube 222 which connects the pneumatic device 221 with the tube member 210; and a solenoid valve 223 which is provided between the pneumatic device 221 and the pneumatic tube 222 and opens and closes the pneumatic tube 222.

The solenoid valve 223 opens the pneumatic tube 222 when the pneumatic device 221 operates, and closes the pneumatic tube 222 when the pneumatic device 221 stops operating so as to block the inflow and outflow of compressed air.

The top plate 230 for the tube member is horizontally fixed on the upper surface of the tube member 210.

The top plate 230 for the tube member is preferably a solar panel.

The vertical position of the top plate 230 for the tube member changes according to the expansion and contraction of the tube member 210 in a vertical direction.

The plurality of solar panel assemblies 240 for tube member sidewalls is provided between the top plate 230 for the tube member and the base frame 100.

In the embodiment, the top plate 230 for the tube member has a rectangular shape, and the solar panel assemblies 240 for tube member sidewalls are arranged respectively on four sides of the top plate 230 for the tube member, so a total of four solar panel assemblies 240 for tube member sidewalls are provided.

The plurality of solar panel assemblies 240 for tube member sidewalls is disposed to surround the tube member 210.

Each of the solar panel assemblies 240 for tube member sidewalls has a plurality of solar panels 241 for a unit sidewall coupled to each other to be foldable in a vertical direction. The upper end of the solar panel assembly 240 is connected rotatably to the edge of the top plate 230 for the tube member, and the lower end of the solar panel assembly 240 is connected rotatably to the base frame 100.

In addition, the solar power generator includes an optical sensor 150, which provides a solar direction detection signal, provided on the upper surface of the base frame 100, and a controller 160 which controls the rotation angle of each of the first, second, third, and fourth solar panel members 110, 120, 130, and 140 for forming a box according to the solar direction detection signal detected by the optical sensor 150.

The controller 160 controls the first, second, third, and fourth motors 110a-1, 120a-1, 130a-1, and 140a-1, the pneumatic device 221, and the solenoid valve 223 such that the solar power generator is unfolded to have a shape enabling solar power generation or is transformed into a box shape in which solar power generation is not performed. Furthermore, the controller 160 controls the rotation angle of each of the first, second, third, and fourth solar panel members 110, 120, 130, and 140 for forming a box according to the solar direction detection signal detected by the optical sensor 150, that is, allows the first, second, third, and fourth solar panel members 110, 120, 130, and 140 for forming a box to be unfolded to have optimal solar power generation efficiency such that solar power generation efficiency can be increased.

The operation of the solar power generator described above will be described.

When the solar power generator is not used, the tube member 210 located inside is contracted in a vertical direction as illustrated in FIGS. 1 and 5, and the plurality of solar panel members 110, 120, 130, and 140 for forming a box has a box shape in which the tube member 210 is stored.

Specifically, air inside the tube member 210 is discharged to the outside and the tube member 210 is contracted in the vertical direction, and accordingly, the height of the top plate 230 for the tube member is decreased as much as possible, and each of the solar panel assemblies 240 for tube member sidewalls connected to the top plate 230 for the tube member is changed to a folded state.

Furthermore, the plurality of solar panel members 110, 120, 130, and 140 for forming a box is changed into the shape of a quadrangular box, in which the tube member 210 contracted vertically, the top plate 230 for the tube member, and the solar panel assemblies 240 for tube member sidewalls are mounted.

The solar power generator having such a structure can minimize air resistance even when mounted on a roof of an electric vehicle.

In this state, when solar power generation is required, the structure is changed through the state of FIG. 6 to the state of FIGS. 4 and 7.

That is, the first motor 110*a*-1, the second motor 120*a*-1, the third motor 130*a*-1, and the fourth motor 140*a*-1 are operated by the control signal of the controller 160, and the first, second, third, and fourth solar panel members 110, 120, 130, and 140 for forming a box are rotated outward and unfolded horizontally as illustrated in FIG. 4 to maximize a solar power generation area.

Furthermore, the solenoid valve 223 is opened by the control signal of the controller 160, and the pneumatic device 221 operates such that compressed air is introduced into the tube member 210. Accordingly, as the tube member 210 expands upward, the height of the top plate 230 for the tube member gradually increases, and each of the solar panel assemblies 240 for tube member sidewalls connected to the top plate 230 for the tube member is changed to an unfolded state to maximize a solar power generation area.

When the tube member 210 is completely expanded upward, the pneumatic device 221 stops operating, and the solenoid valve 223 is closed.

In this state, when solar power generation is not required, the solar power generator is changed through the state of FIG. 6 to the state of FIGS. 1 and 5.

That is, due to the control signal of the controller 160, the solenoid valve 223 opens and the pneumatic device 221 operates such that air is discharged from the tube member 210. Accordingly, as the tube member 210 is contracted vertically, the height of the top plate 230 for the tube member gradually decreases, and each of the solar panel assemblies 240 for tube member sidewalls connected to the top plate 230 for the tube member is changed to a folded state.

When the tube member 210 is completely contracted downward, the pneumatic device 221 stops operating, and the solenoid valve 223 is closed.

In addition, the first motor 110*a*-1, the second motor 120*a*-1, the third motor 130*a*-1, the fourth motor 140*a*-1 are operated by the control signal of the controller 160, and the first, second, third, and fourth solar panel members 110, 120, 130, and 140 for forming a box rotate inward to be folded into the shape of a quadrangular box as illustrated in FIG. 1.

Meanwhile, according to the embodiment, in order to generate power even when the solar power generator of the present disclosure is in the state of the quadrangular box, solar panels may be provided respectively on opposite surfaces of each of the four solar panel members for forming a box, or a bifacial solar panel capable of generating power on opposite surfaces thereof may be adopted.

Furthermore, the solar power generator may further include a connection terminal for supplying generated electric energy to a charger of the vehicle.

The solar power generator of the present disclosure described above may be installed in a portable form on a roof of a vehicle without deteriorating the beauty of the vehicle.

In addition, the solar panel of the solar power generator of the present disclosure is automatically adjusted to have a right angle with respect to the incident direction of sunlight, thereby increasing power generation efficiency.

The above description of the present disclosure is only for illustrative purposes, and those skilled in the art will appreciate that various modifications are possible without departing from the scope and spirit of the present disclosure. Therefore, it should be understood that the embodiment described above is illustrative in all respects and not limiting. For example, each component described as a single type may be implemented in a distributed manner, and similarly, components described as being distributed may also be implemented in a combined form.

The scope of the present disclosure is indicated by the claims to be described later rather than the detailed description, and it should be interpreted that all changes or modified forms derived from the meaning and scope of the claims and concept equivalent thereto are included in the scope of the present disclosure.

What is claimed is:

1. A solar power generator having a variable shape, the generator comprising:
a base frame having a rectangular shape;
four solar panel members for forming a box which are respectively coupled to four sides of the base frame to rotate inward and outward, the solar panel members being configured to form a shape of a rectangular box in cooperation with the base frame when the solar panel members rotate inward and to be unfolded when the solar panel members rotate outward;
a rotation drive source for rotating each of the four solar panel members inward and outward;
a tube member, a lower surface of which is fixed to a center portion of an upper surface of the base frame, the tube member being configured to expand in a vertical direction by air injection and to contract in the vertical direction by air discharge;
an air injection and discharge part for injecting air into the tube member and discharging air inside the tube member;
a top plate for the tube member being fixed horizontally on an upper surface of the tube member; and
a plurality of solar panel assemblies for tube member sidewalls being arranged around the tube member to surround the tube member, each of the plurality of solar panel assemblies having a plurality of solar panels for a unit sidewall coupled to each other to be foldable in the vertical direction, wherein an upper end of the solar panel assembly is connected rotatably to an edge of the top plate, and a lower end of the solar panel assembly is connected rotatably to the base frame.

2. The generator of claim 1, wherein when the four solar panel members for forming a box rotate outward, the four solar panel members for forming a box are unfolded horizontally.

3. The generator of claim 1, wherein the four solar panel members for forming a box comprise:
   a first solar panel member for forming a box located at a front side;
   a second solar panel member for forming a box located at a rear side;
   a third solar panel member for forming a box located at a left side; and
   a fourth solar panel member for forming a box located at a right side,
   wherein the first solar panel member for forming a box comprises: a 1-1 solar panel for forming a box which is rotatably coupled to the base frame at a first end part thereof; and a 1-2 solar panel for forming a box which is rotatably coupled to a second end part of the 1-1 solar panel for forming a box at an end part thereof.

4. The generator of claim 3, wherein the rotation drive source comprises a first rotation drive source for rotating the first solar panel member for forming a box,
   wherein the first rotation drive source comprises:
   a 1-1 drive shaft which is provided on the first end part of the 1-1 solar panel for forming a box and is rotatably supported on the base frame;
   a first motor for rotating the 1-1 drive shaft;
   a 1-2 drive shaft which is provided on the end part of the 1-2 solar panel for forming a box and is rotatably supported on the second end part of the 1-1 solar panel for forming a box; and
   a first belt which couples the 1-1 drive shaft to the 1-2 drive shaft.

5. The generator of claim 1, wherein the air injection and discharge part comprises: a pneumatic device for conveying air; a pneumatic tube which connects the pneumatic device with the tube member; and a solenoid valve which is provided between the pneumatic device and the pneumatic tube and opens and closes the pneumatic tube.

6. The generator of claim 1, wherein the top plate is a solar panel.

7. The generator of claim 1, further comprising:
   an optical sensor which provides a solar direction detection signal; and
   a controller which controls the rotation drive source according to the solar direction detection signal for controlling a rotation angle of each of the four solar panel members for forming a box.

8. The generator of claim 1, wherein the solar panel member for forming a box has solar panels disposed respectively on opposite surfaces thereof or comprises a bifacial solar panel capable of generating power on opposite surfaces thereof.

9. The generator of claim 1, wherein the base frame is mounted on a roof of a vehicle.

* * * * *